A. BURBANK.
CURTAIN CORD TIGHTENER.
No. 179,158.  Patented June 27, 1876.
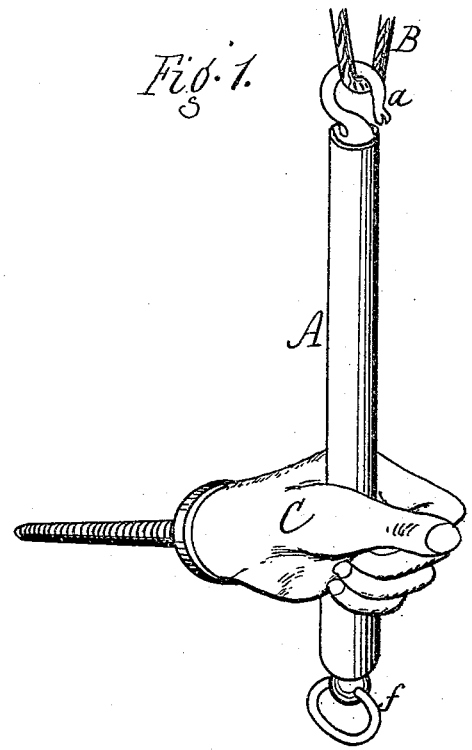
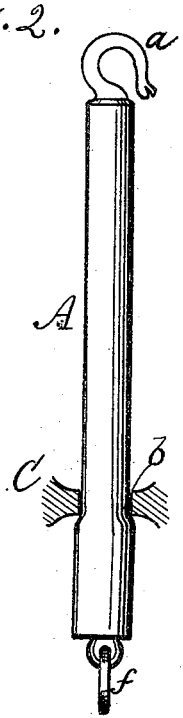
Witnesses.
E. B. Scott
Lewis V. Rathbone
Inventor.
Abner Burbank,
per R. F. Osgood,
Atty.

UNITED STATES PATENT OFFICE.

ABNER BURBANK, OF ROCHESTER, NEW YORK.

IMPROVEMENT IN CURTAIN-CORD TIGHTENERS.

Specification forming part of Letters Patent No. 179,158, dated June 27, 1876; application filed March 25, 1876.

*To all whom it may concern:*

Be it known that I, ABNER BURBANK, of the city of Rochester, in the county of Monroe and State of New York, have invented a certain new and useful Improvement in Curtain-Cord Fasteners; and I do hereby declare that the following is a full, clear, and exact description of the construction and operation of the same, reference being had to the accompanying drawings, in which—

Figure 1 is a perspective view of my improvement. Fig. 2 is an elevation with the lower bearing in section, showing the means for tightening the cord.

My improvement relates to devices for tightening curtain-cords. Such devices have usually been made of metal with slides working into ratchet-teeth. Other forms have, however, been used, such as an elastic length in the cord itself, or an elastic strap attached at the bottom to the wood-work by a screw, and at the top to a stirrup carrying the curtain-cord roller, and tightened by drawing the end of the strap upward between cross-bars. A wedge-shaped clasp has also been employed, through which an ordinary window cord or tape has passed, which holds the said cord firm when pressed therein.

My invention consists of a rubber strap or length having a hook at the top, through which passes the cord, and its bottom end extending through a metallic bearing, by which its tension may be increased by drawing the rubber down, as hereinafter described.

A represents the rubber strap or length. It may be round or flat, and of any desired length. To the upper end is attached an open hook, *a*, through which the curtain-cord B passes. The lower end of the rubber strap passes through a bearing or fixture, C, which is screwed or otherwise attached to the window-casing. This bearing or fixture may be of any desired form, but I prefer that of a clenched hand. The eye *b* of the bearing, through which the strap passes, is made close-fitting, as shown in Fig. 2, by which means, when the rubber is drawn down through the said eye, it retains its place by the swelling or enlargement of the rubber below the eye, as indicated in Fig. 2. By this means any desired degree of tension may be given to the rubber strap, and this tension it will retain till the rubber becomes permanently stretched, when it can be drawn down again, thereby renewing the elasticity. A ring, *f*, may be attached to the lower end of the rubber; and, if desired, the rubber may be covered by a tassel or other ornamental covering; or the body of the rubber itself may be colored or ornamented in any desired way.

The advantage of this device is, that it is exceedingly cheap, is easily applied, and is more enduring than ordinary metallic fixtures. It has a greater degree of elasticity than common fixtures, which depend alone upon the elasticity of the cord. It obviates the slipping and consequent slackening of the cord, which is such an objection to common fixtures. The lengths of rubber are simply cut from a long tube or strip. They can, therefore, be furnished at very small cost. The hook and bearing are very cheap. This device can be furnished at much less cost than common metallic fixtures.

I do not claim simply a spring for acting upon the curtain-cord. Neither do I claim interposing an elastic section in the cord itself; but

What I claim as new is—

The curtain-cord fastener consisting of the rubber strap A, provided with the hook *a* at the top, and the bearing C, provided with an eye, through which the rubber is drawn to increase its tension, as and for the purpose specified.

In witness whereof I have hereunto signed my name in the presence of two subscribing witnesses.

ABNER BURBANK.

Witnesses:
 E. B. SCOTT,
 R. F. OSGOOD.